July 17, 1934.  M. P. H. L. RAEPSAET  1,966,560

MOLD

Filed Aug. 24, 1931

Inventor:
M. P. H. L. Raepsaet
by E. F. Wenderoth
atty

Patented July 17, 1934

1,966,560

UNITED STATES PATENT OFFICE 1,966,560

MOLD

Maurice Paul Henri Leon Raepsaet, Aurec-sur-Loire, France, assignor to Societe Belge du Caoutchouc Mousse, Berchem - Ste - Agathe, Belgium, a corporation of Belgium Application August 24, 1931, Serial No. 559,105 In Germany July 25, 1931

2 Claims. (Cl. 18—2)

It is known that the essential operation in the manufacture of cellular rubber with closed cells consists of a vulcanization in an autoclave and in an atmosphere of gas under very high pressure. For this operation it is necessary that the rubber blanks should be enclosed in such a manner that the rubber which has become cellular should be unable to expand freely when the pressure in the autoclave is reduced. Up to the present this result has been achieved by enclosing the blanks in molds, a method which is attended with numerous inconveniences. The author of the present invention has also proposed, in his French Patent 682,381 of September 27, 1929, to enclose the blanks in a receptacle or mandrel containing a filling material, but this process does not allow the employment of very deep receptacles owing to the difficulty of packing the filling material uniformly round the blanks, which is an indispensable condition for preventing the formation of protuberances during the expansion that occurs when the articles of cellular rubber are taken out of the molds.

The invention relates to a process and apparatus which remedy these inconveniences.

The process is characterized by the fact that the articles are disposed in layers, each layer being placed in a sectional mold of low height and the powder is rammed tightly and uniformly around them. This is an easy matter in view of the low height of the corresponding sectional mold and because, for this purpose, the mandrel is constructed of a plurality of detachable stages. The filling material preferably consists of non-resinous wood flour, mixed with talc and which has been baked in previous operations.

A typical embodiment of the various appliances constituting the apparatus for the manufacture of cellular rubber articles, is hereinafter described and is illustrated in the accompanying drawing.

Figure 1:
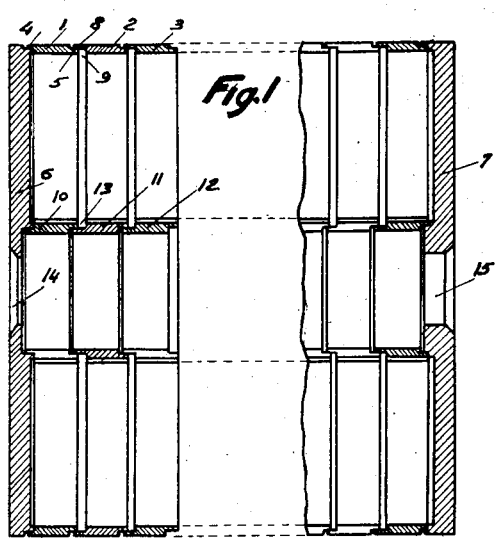
Figure 2:
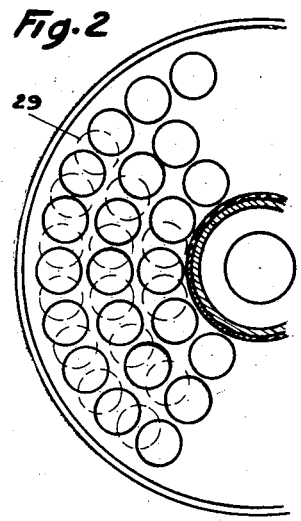
Figure 3:
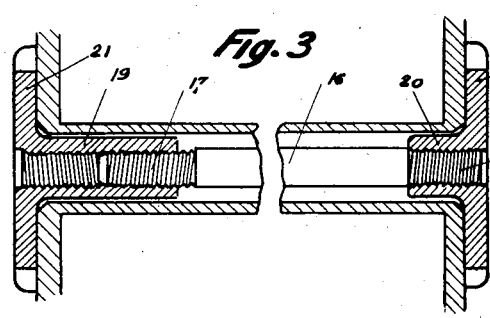
Figure 4:
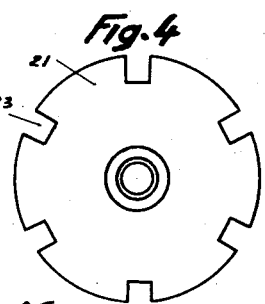
Figure 6:
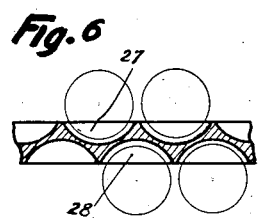
Figure 5:
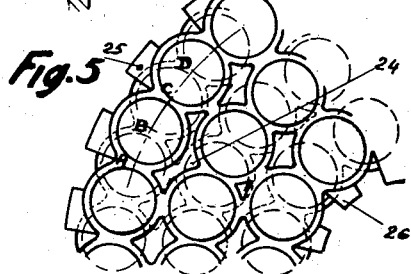
Figure 7:
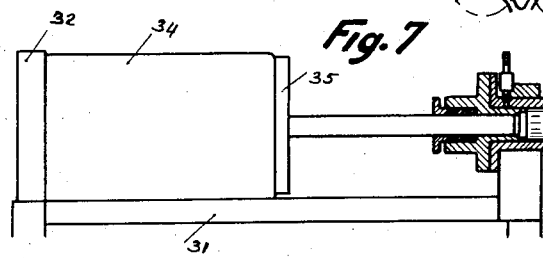

Figure 1 is a longitudinal, diametrical section of the receptacle, or mandrel, composed of rings intended to receive the ball blanks and to be placed in the autoclave. Figure 2 is an end elevation of one ring of said mandrel, charged with ball blanks. Figures 3 and 4 represent, respectively, a longitudinal and end elevation of the shaft by means of which the several rings constituting the mandrel are locked together. Figures 5 and 6 represent a plan and a curved section along ABC of Figure 5, respectively, of a plate intended to be interposed between the several rings of the mandrel. Figure 7 is a press in which the molds are taken out of the mandrel.

According to Figures 1 and 2, the mandrel is composed of a series of metal rings, such as 1, 2, 3 &c. Each ring, (for example 1) is provided with an outside rabbet 4 at one end and an inside rabbet 5 on the other, to enable it to be assembled with the adjacent rings or with a cover 6 or 7 at each end of the mandrel. The left hand rabbet 8 of the ring 2, for example, is higher than the right hand rabbet 5 of the adjoining ring so as to leave inside the cylinder a groove 9 for the insertion (as explained later) of a plate 24, the details of which are shown in Figures 5 and 6. Each outer ring 1 is associated with an inner ring 10 of the same height, and the inner rings 10, 11, 12 are assembled in the same manner as the outer rings 1, 2, 3 so as to leave intermediate grooves 13 disposed in the same plane as the grooves 9, and, like these latter, intended to receive the plates 24 shown in Figures 5 and 6.

The two end plates 6 and 7 are provided with central bores 14 and 15 for the passage of the shaft 16 which is shown in Figures 3 and 4 and serves to lock together all the rings composing the mandrel. This shaft 16 is provided at each extremity with a threaded portion 17, 18, on which is screwed a sleeve 19, 20, provided with a collar 21 or 22. The rim of each collar 21 (Figure 4) for example, is provided with a certain number of notches 23 to enable it to be tightened up or unscrewed.

The central shaft 16 might be replaced by several symmetrically disposed shafts.

A plate of planar or cellular cross section (such as 24 in Figures 5 and 6) may be interposed in the grooves 9, 13, between each pair of outer rings 1, 2, and inner rings 10, 11. This plate fits into the grooves 9 and 13 by means of its outer and inner extensions 25 and 26. As can be seen clearly (Figure 6) it is constituted on the curved section (ABCD) of Figure 5, by a series of offset cells 27, 28, arranged on the two sides of the plate, and adapted to be provided with openings to facilitate ramming the filling material.

To charge the mold, one of the terminal covers (6 for example) is first laid horizontally, and the shaft 16 fitted with its lower nut 19, is inserted through the bore 14, after which the outer ring 1 and inner ring 10 are placed in position. The annular space between the rings 1 and 10 is filled with ball blanks 29 disposed in the manner shown in Figure 2 and surrounded by well rammed filling material. This filling material is preferably composed of non-resinous wood flour mixed with talc and forming a powder that has been baked in the previous operations. When all the balls 29 have been disposed in the described manner in the plane of the ring 1, this latter is covered with a cellular plate 24 in such a manner that the cells 28 on the underside fit exactly over the balls 29. The ramming of the filling material is completed through the openings in said plate. In this manner, the compartment formed by the ring constitutes a completely closed, but not impermeable mold, in which the ball blanks are powerfully compressed in a rammed powder which, while permitting the access of the gas, under high pressure, to the balls, uniformly prevents the latter from expanding up to the moment of their removal from the mold.

The rings 2 and 11 are then placed over the rings 1 and 10 and a second compartment is obtained, the bottom of which is formed by the cellular plate 24 enclosed between these two rings. This compartment is filled with balls in the same manner, the balls being offset in relation to those in the preceding layer, and the operation is repeated until all the rings are in position. This arrangement enables the mandrel to be uniformly filled, with ease, and the filling material to be firmly and evenly rammed round each ball despite the length of the mandrel. The upper cover 7 is then put on and the flanged nut 22 is screwed tightly on to the shaft 16, and the mandrel is ready for insertion in the autoclave.

When the vulcanization in the autoclave under very high pressure of gas, has been carried to the desired degree, the pressure in the autoclave is reduced and the mandrel is taken out. Owing to the considerable degree with which the balls would suddenly expand on being taken out of the mandrel, it is necessary to employ great precautions in performing that operation. For this purpose the machine shown in Figure 7, is used. It comprises a table or cradle 31 provided, at one end, with a powerful annular abutment 32, whilst an hydraulic press 37 is secured at the other end. On removal from the autoclave, the mandrel 34, charged with balls, is placed in position against the abutment 32 as shown in the figure. The press plate 35 is brought into contact with the end of the mandrel 34 so as to bear sufficiently to enable the nut 21 to be unscrewed from the further end of the interior shaft 16 of the mandrel. The stop 32 has an opening therein sufficient for nut 21 and the unscrewing tool. The two covers 6 and 7 being thus disconnected, the press plate 35 is withdrawn so that the balls 29 commence their permitted expansion in the longitudinal direction through the divergence of the rings, and, in the lateral direction, through the escape of the filling material, which occurs when the rings are no longer held together. When the pressure has ceased to be manifest in the longitudinal direction, the balls in each layer will be found jammed together in the transverse direction. The rings can then be safely taken out in succession, and the jammed balls inside can be ejected.

During the baking process in the autoclave, it is essential that all the balls should be raised to the same temperature. This is rather difficult when the mandrels are of large diameter, such as about 60 centimetres for a mandrel with a length of about 1 metre. The planar or cellular plates 24 have the advantage of transmitting the heat of the heating fluid in the autoclave from the exterior to the interior of the mandrel, in each layer and in proximity to each ball, so that, despite the low heat conductivity of the filling material, all the balls are raised to approximately the same temperature, whatever their position in the mandrel.

Mandrels of large diameter, such as 60 cm. and a length of 1 metre are difficult to handle on account of their weight. In order to reduce the weight it is advantageous to employ a double mandrel consisting of a central mandrel and an annular mandrel fitting over the first one.

The vulcanization in the autoclave can be arrested before attaining completion and be terminated in an expansion mold after the balls have been taken out of the mandrel, by heating until the gas in the cells of the rubber has attained a degree of pressure equal to the atmospheric pressure when the rubber has been brought back to the ordinary temperature.

What I claim is:—

1. A mold for vulcanizing the crude rubber blanks for balls and other small articles placed in the mold within a filling powder, said molds being adapted to be placed in the autoclave in the presence of an inert gas under high pressure capable of being incorporated in the rubber in such manner as to produce cellular rubber having closed cells, comprising a series of superposed case rings, perforated plates positioned between said rings, two end plates, assemblage means and locking means.

2. A mold according to claim 1 in which the perforated plates are provided upon their two surfaces with ridges forming two series in quincunx.

MAURICE PAUL HENRI LEON RAEPSAET.